US008508159B2

(12) United States Patent
Herrmann et al.

(10) Patent No.: US 8,508,159 B2
(45) Date of Patent: Aug. 13, 2013

(54) DEVICE AND METHOD FOR CONTROLLING THE MOVEMENT OF A BOTH MOTORICALLY AND MANUALLY MOVABLE VEHICLE PART

(75) Inventors: Christian Herrmann, Coburg (DE); Stephan Deister, Doerfles-Esbach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 518 days.

(21) Appl. No.: 12/640,929

(22) Filed: Dec. 17, 2009

(65) Prior Publication Data

US 2010/0156139 A1 Jun. 24, 2010

(30) Foreign Application Priority Data

Dec. 19, 2008 (DE) ........................ 10 2008 064 570

(51) Int. Cl.
*H02P 7/00* (2006.01)

(52) U.S. Cl.
USPC .......... 318/257; 318/255; 318/256; 296/1.01; 296/146.1; 296/146.4

(58) Field of Classification Search
USPC ............. 318/255, 256, 257; 296/1.01, 146.1, 296/146.4
See application file for complete search history.

(56) References Cited

U.S. PATENT DOCUMENTS 4,530,185 A * 7/1985 Moriya et al. .................. 49/280
5,468,042 A * 11/1995 Heinrichs et al. .......... 296/146.4
5,780,979 A * 7/1998 Kim ................................ 318/15
6,382,706 B2 * 5/2002 Yuge et al. ................. 296/146.4
6,398,288 B1 * 6/2002 Yuge .......................... 296/146.4
6,425,206 B1 * 7/2002 Noda et al. ....................... 49/360
6,452,353 B1 * 9/2002 Calamatas .................... 318/466
6,525,499 B2 * 2/2003 Naganuma .................... 318/445
6,901,704 B2 * 6/2005 Sakaue et al. .................... 49/340
7,071,644 B2 * 7/2006 Kawanobe .................... 318/280
7,637,057 B2 * 12/2009 Matsui et al. ................... 49/345
2009/0217596 A1 * 9/2009 Neundorf et al. ............... 49/506

FOREIGN PATENT DOCUMENTS

DE 601 20 238 T2 7/2001
DE 101 14 938 A1 10/2001
DE 10 2004 017 264 B4 11/2004
DE 601 20 238 T2 3/2007
DE 10 2005 061 610 A1 7/2007
WO WO 2007/071641 A1 6/2007

* cited by examiner

*Primary Examiner* — Kawing Chan
(74) *Attorney, Agent, or Firm* — Christie, Parker & Hale, LLP

(57) ABSTRACT

A device for controlling the movement of a both motorically and manually movable vehicle part includes a drive unit controllable in its rotational speed for motorically moving the vehicle part, a coupling device for coupling the drive unit with the vehicle part, and a control unit which controls the drive unit and the coupling device such that during manually moving the vehicle part the coupling device couples the drive unit with the vehicle part if the vehicle part has reached a predefined position. The control unit controls the rotational speed of the drive unit depending on the moving speed of the vehicle part. In this way, a device and a method are provided which in an easy and low-wear manner allow for a control of the movement of a both motorically and manually movable vehicle part.

16 Claims, 4 Drawing Sheets

DEVICE AND METHOD FOR CONTROLLING THE MOVEMENT OF A BOTH MOTORICALLY AND MANUALLY MOVABLE VEHICLE PART

CROSS-REFERENCE TO A RELATED APPLICATION

This application claims priority of German Patent Application Number 10 2008 064 570.2, filed on Dec. 19, 2008.

BACKGROUND

The invention relates to a device for controlling the movement of a both motorically and manually movable vehicle part and a method for controlling the movement of a both motorically and manually movable vehicle part.

Such a device comprises a drive unit being controllable in its rotational speed for motorically moving the vehicle part, a coupling device for coupling the drive unit to the vehicle part, and a control unit. The control unit controls the drive unit and the coupling device such that, when manually moving the vehicle part, the drive unit is coupled via the coupling device to the vehicle part if the vehicle part has reached a predefined position.

To prevent the manually moved vehicle part—for example a vehicle door, a rear door, a sliding door or the like—hitting an end stop during an opening movement it is known to connect the moved vehicle part, for example the vehicle door, via a coupling device with a motoric drive unit within a drive train and to decelerate the vehicle part via the drive train. In dependence of the door speed, herein, the coupling is adjusted and a defined braking torque is generated to reduce the moving speed of the vehicle part before reaching the maximally opened position and to dampen the hitting of the vehicle part on the end stop. The coupling device is, for example, constituted as an electromagnetic coupling of the type of a disc brake. Herein, because of the slippage of the coupling device occurring within the coupling device usually an abrasion occurs, which makes a service of the coupling device in regular intervals necessary and has an influence on the system characteristics of the coupling device over its live span.

The coupling device can furthermore be used to fixedly hold the vehicle part, namely to hold it in its opened position. An electromagnetic coupling device herein comprises the disadvantage that for maintaining the coupling a permanent current supply is necessary such that the current supply system of the vehicle is continuously strained and a vehicle battery is emptied when the vehicle door is opened and held fixedly.

From WO 2007/071641 A1 a device and a method for controlling the closing movement of a manually movable vehicle part is known, in which the vehicle part during the closing movement, starting from the opened position, passes a first adjustment region in which the vehicle part is moved without engagement of a separate control means towards a closed position and subsequently passes a second adjustment region in which the closing movement of the vehicle part is controlled through the control means. The closing movement of the vehicle part, thus, only in the beginning is free and uncontrolled, whereas in the second adjustment region when approaching the closed position the closing movement of the vehicle part occurs in a guided manner such that an uncontrolled slam-shut of the vehicle part, for example a vehicle door, is prevented.

SUMMARY

It is an object of the invention to provide a device and a method which in an easy and low-wear manner allow for controlling the movement of a both motorically and manually movable vehicle part.

Herein, it is provided that the control unit, for the coupling, controls the rotational speed of the drive unit in dependence on the moving speed of the vehicle part.

In particular, by means of the control unit the rotational speed of the drive unit can be adjusted such that the rotational speed of the drive unit is adapted to the moving speed of the vehicle part. Thereby, it becomes possible to use a coupling device of the type of a clutch coupling in which the coupling is achieved in a positive locking or forced locking manner without slippage.

With a positive locking coupling of the drive unit with the vehicle part, embodiments of a coupling device for example can be used in which the gearing parts to be coupled, for example gearing wheels, are brought into engagement in a positive locking manner and thereby achieve the coupling. The coupling device thereby works essentially without slippage such that a wear by abrasion is essentially avoided.

For achieving a force locking coupling, for example an electromagnetic coupling device can be used in which, via a coil, a magnetically soft material is altered in its magnetization and, because of the altering of the magnetization, the force locking coupling is achieved. If the electromagnetic coupling device is energized, the parts to be coupled (for example constituted as coupling discs) are, due to static friction, brought into a force locking engagement. Because of the adjusted speed of the drive unit and the vehicle part, the coupling can be established abruptly and, thus, essentially without slippage and does not have to be built up slowly.

To be able to use a coupling device for providing an essentially slippage-free coupling, the drive unit is adapted in its rotational speed to the moving speed of the vehicle part, for example a vehicle door, prior to establishing the coupling. The drive unit, hence, prior to establishing the coupling is synchronized with the moving speed of the vehicle part, i.e. it is brought already in its idle time into a rotational speed which allows coupling the drive unit with the vehicle part without slippage. The parts to be coupled, hence, move with the same speed prior to establishing the coupling such that they can be brought into engagement with each other in a slippage-free manner and then couple the drive unit in a force locking or positive locking manner with the vehicle part. If the drive unit is engaged with the vehicle part, the movement of the vehicle part can be controlled, in particular decelerated by suitably controlling the drive unit in order to dampen the hitting of an end stop when opening the vehicle part or to prevent an uncontrolled slam-shut when closing the vehicle part.

The device can for example comprise a rotational speed sensor for detecting the rotational speed of the drive unit and a position and speed sensor for detecting the position and/or the speed of the vehicle part. Via the rotational speed sensor the rotational speed of the drive unit is detected and is adjusted to the moving speed of the vehicle part being measured through the position and speed sensor such that a coupling of the drive unit with the vehicle part becomes possible.

The coupling device advantageously comprises three coupling states.

In a first coupling state the drive unit is decoupled from the vehicle part such that the vehicle part, for example a vehicle door, can be manually moved independently from the drive unit. This coupling state is also referred to as "non-energized open".

In a second coupling state the drive unit is coupled with the vehicle part, the coupling device hence is in a coupling engagement and is energized herein for the actuation. This second coupling state, which ensures a maximum engagement of the coupling device, is adopted by the coupling device when motorically moving the vehicle part. A manual movement of the vehicle part independent from the drive unit is not possible. This coupling state is also referred to as "energized closed".

In a third coupling state the drive unit is coupled with the vehicle part. Herein, the coupling device however is not energized for actuation such that the coupling device connects the drive unit in a coupling manner with the vehicle part, at the same time however does not consume power. This third coupling state, also referred to as "non-energized holding", can for example be used for fixedly holding the vehicle part in an opened position, wherein by the non-energized holding of the coupling without power consumption the supply system of the vehicle is not strained.

The device in particular is constituted for providing an end stop damping when moving the vehicle part into an opened position. If, for example, a vehicle door is manually moved from a closed position into an opened position, the coupling device, controlled by the control unit, establishes a coupling of the drive unit with the vehicle part as soon as the vehicle part has reached a predefined position—for example a vehicle door has reached a predefined opening angle. After passing the predefined position, hence, the opening movement of the vehicle part is no longer free, but is guided by the drive unit coupled with the vehicle part and is decelerated by reducing the rotational speed of the drive unit. Via the drive unit, thus, the vehicle part can be transferred into a standstill without the vehicle part hitting an end stop. If the standstill is reached, the vehicle part can be fixedly held in the opened position in that the coupling device—according to the third coupling state described above—couples the drive unit in a non-energized manner with the vehicle part.

In addition or alternatively, the device can be constituted to provide a slam-shut prevention when moving the vehicle part into a closed position. The device, hence, not only controls the opening of the vehicle part, but also the closing in that the coupling device, prior to reaching the closed position, couples the drive unit with the vehicle part and by controlling the rotational speed of the drive unit controls the movement of the vehicle part. In particular, the vehicle part can in this way, by controlling the drive unit, be decelerated down to a predefined nominal speed in order to be transferred in a controlled and guided manner into the closed position.

The objective furthermore is achieved through a method for controlling the movement of a both motorically and manually movable vehicle part using a device comprising a drive unit controllable in its rotational speed for motorically moving the vehicle part, a coupling device for coupling the drive unit with the vehicle part and a control unit for controlling the drive unit and the coupling device. When manually moving the vehicle part, the drive unit herein is coupled via the coupling device with the vehicle part if the vehicle part has reached a pre-defined position. In addition, it is provided that for the coupling the rotational speed of the drive unit is adapted to the moving speed of the vehicle part.

It herein is the idea, for the coupling of the drive unit with the vehicle part, to adjust the rotational speed of the drive unit prior to the coupling, i.e. already in the idle state, to the moving speed of the vehicle part, i.e. to synchronize it with the movement of the vehicle part such that a slippage-free, force locking or positive locking coupling of the drive unit with the vehicle part can be established. The coupling is established when the vehicle part has reached a pre-defined position, for example a vehicle door has passed a predefined critical opening angle. After coupling the vehicle part with the drive unit the movement of the vehicle part then takes place in a guided manner and can, by controlling the drive unit, be controlled, in particular be decelerated.

The pre-defined position, at the reaching of which the coupling is established, can be previously defined and set. However, it is advantageous to individually determine the pre-defined position, for example a critical opening angle of a vehicle door, in dependence on the movement of the vehicle part, in particular in dependence on its moving speed.

The basis for this is that the required braking path, for example of a vehicle door, critically depends on the moving speed of the vehicle door. If for example a vehicle door is opened and if the vehicle door shall be prevented hitting an end stop, a comparatively small braking path is required at a small moving speed of the vehicle door, however a large braking path prior to reaching the end stop is required at a large moving speed. Accordingly, the critical opening angle is determined and set, wherein the critical opening angle is determined from the difference of the desired opening angle, i.e. for example the end position of the vehicle door, and the required braking angle. The estimation of the braking angle can for example be carried out assuming a linear dependence between the actual angular speed of the vehicle door and the braking path of the vehicle door. If the critical opening angle set according to the moving speed of the vehicle door is reached, the coupling of the drive unit with the vehicle door is established and, subsequently, the drive unit is controlled for guiding the movement of the vehicle door.

If the pre-defined position, for example the critical opening angle of the vehicle door, thus is reached, the coupling device is energized and thereby actuated for establishing the coupling of the drive unit with the vehicle part. From the first coupling state described above, the coupling device thereby is brought into the second coupling state.

To influence the movement of the vehicle part in the desired manner after establishing the coupling, the rotational speed of the drive unit is controlled. Herein, it in particular can be provided to reduce the rotational speed of the drive unit for decelerating the vehicle part in order to avoid a hard hit of an end stop when opening the vehicle part or when closing the vehicle part. To maintain the coupling of the drive unit with the vehicle part in a secure and reliable manner during the movement of the vehicle part the coupling device is energized during the movement of the vehicle part and, hence, is held in the second coupling state.

For providing an end stop damping when moving the vehicle part into an opened position it preferably is provided that the drive unit decelerates the vehicle part to a standstill. After reaching the standstill, the coupling device can then maintain the coupling and in this way fixedly hold the vehicle part, wherein the coupling device is not energized, hence does not consume any power and does not strain the electric supply system of the vehicle. This state of the coupling device, previously described as third coupling state, is also referred to as "non-energized holding", wherein the coupling provided by means of the coupling device preferably is constituted such that the vehicle part is securely fixed, but is released in case of a manual force applied to the vehicle part such that the vehicle part can be moved manually in a free fashion without huge effort.

In addition or alternatively to the end stop damping also a slam-shut prevention when moving the vehicle part into a closed position can be provided, in the context of which the drive unit decelerates the vehicle part into a predefined moving speed when closing the vehicle part. The moving of the vehicle part into the closed position can then take place, in a final phase, in a motorically guided manner through the drive unit coupled with the vehicle part, wherein the drive unit pulls the vehicle part motorically into a closed position, for example a pre-engagement position of a vehicle door. In this final phase, then, the movement of the vehicle part in addition must be monitored for providing a jam protection and must be controlled to avoid, in this motorically controlled final phase, a jamming of an object between the closing vehicle part and the vehicle body.

BRIEF DESCRIPTION OF THE DRAWINGS

The idea underlying the invention shall subsequently be explained in detail according to the embodiments shown in the figures. Herein.

DETAILED DESCRIPTION

Figure 1:
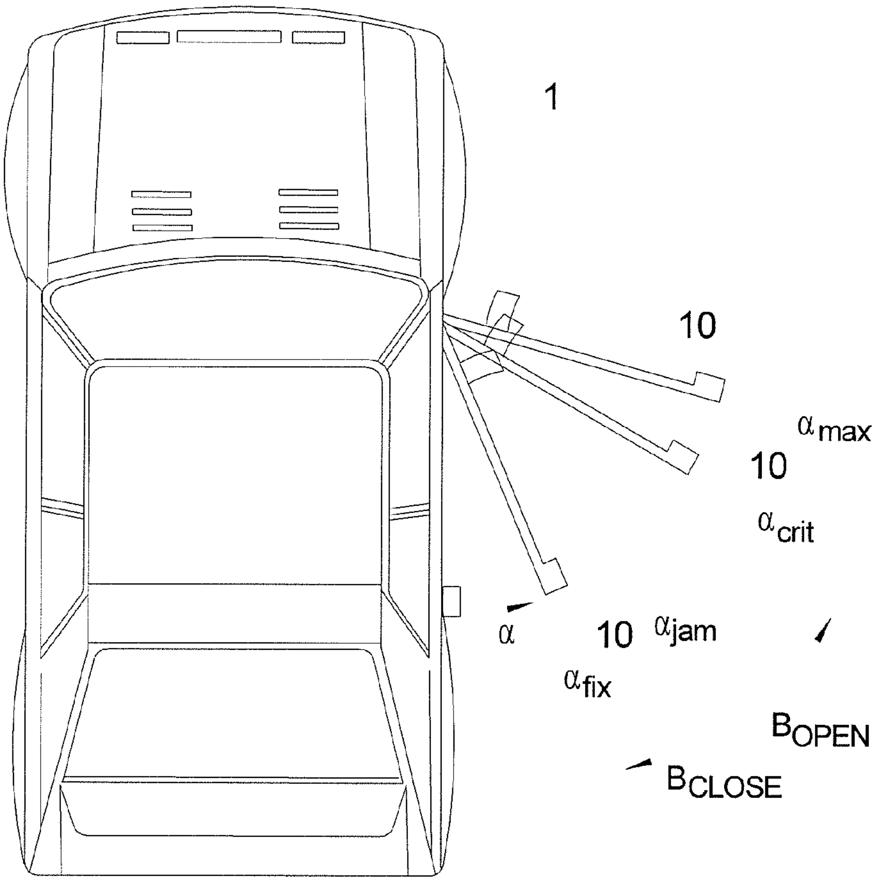
FIG. 1 shows a schematic view of a vehicle with a vehicle door to be moved.

FIG. 1 shows in a schematic overview a vehicle 1 with a side vehicle door 10 constituting a vehicle part to be moved, wherein the vehicle door 10, for opening, can be moved in a moving direction $B_{OPEN}$ and for closing in an opposite moving direction $B_{CLOSE}$. In the closed position the vehicle door 10 closes a side opening in the vehicle body, whereas in a maximally opened position the vehicle door 10 has a maximum opening angle $\alpha_{max}$ which for example can amount to about 75°.

Figure 2:
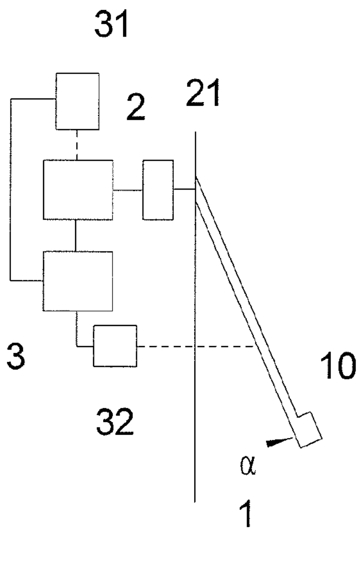
FIG. 2 shows a schematic view of a vehicle door acting together with a device for controlling the movement.

The vehicle door 10 can be moved both motorically and manually and is for this, as shown in FIG. 2, via a coupling device 21 connected to a drive unit 2. The drive unit 2, comprising for example an electric motor and a gearing, is controlled via a control unit 3, wherein the control unit 3 can take over both the control of the drive unit 2, the control of the coupling device 21 and for example the control for providing a jam protection. The control unit 3, for this purpose, is connected with a rotational speed sensor 31 for measuring the rotational speed of the drive unit 2 and with a position and speed sensor 32 for measuring the position and/or the moving speed of the vehicle door 10.

The rotational speed sensor 31 can for example be constituted as a Hall sensor which detects the number of rotations of a drive shaft of the drive unit 2.

The device schematically shown in FIG. 2, comprising the drive unit 2, the control unit 3 and the coupling device 21, serves on the one hand for motorically adjusting the vehicle door 10. For this, the drive unit 2 is connected via the coupling device 21 to the vehicle door 10 such that the drive unit 2 can apply a torque to the vehicle door 10 and can move the latter for opening or closing.

Via the drive unit 2, the control unit 3 and the coupling device 21, on the other hand, a movement of the vehicle door 10 manually initiated by a user can be controlled and influenced. In particular, via the drive unit 2, an end stop damping for preventing the vehicle door 10 from hitting an end stop when opening the vehicle door 10 and a slam-shut prevention for avoiding an uncontrolled slam-shut of the vehicle door 10 when closing can be provided. The coupling device 21 preferably is constituted such that it establishes a force locking or positive locking coupling of the drive unit 2 with the vehicle door 10 according to the type of a clutch coupling in that the components to be coupled are brought into engagement with each other in an abrupt and slippage-free manner. With a positive locking coupling, hence, for example respective gearing parts, for example gearing wheels, are brought into engagement in a positive locking manner. With a force locking coupling, for example an electromagnetic coupling device can be used which brings, through altering the magnetization of one or more coupling parts, the components to be coupled into a force locking engagement due to static friction in an essentially slippage-free manner.

The coupling device 21 can assume at least three coupling states, wherein

- in a first coupling state the drive unit 2 and the vehicle door 10 are decoupled, i.e. the coupling is opened such that the drive unit 2 and the vehicle door 10 are not in engagement with each other,
- in a second coupling state the drive unit 2 is coupled with the vehicle part 10 and herein the coupling device 21 is energized for the actuation,
- in a third coupling state the drive unit 2 is coupled with the vehicle part 10, wherein the coupling device 21 however is not energized for the actuation.

In the second and third coupling state the drive unit 2 therefore is connected, via the coupling device 21, with the vehicle door 10. The second and third coupling state herein differ in that in the second coupling state the coupling device 21 is energized, i.e. it consumes power, to establish the coupling between the drive unit 2 and the vehicle door 10 with a maximum engagement. In the third coupling state, in contrast, the coupling device 21 is not energized such that the coupling device 21 does not consume power. The second coupling state serves for the motoric adjustment of the vehicle door 10, whereas the third coupling state in particular is assumed for fixedly holding the vehicle door 10, i.e. for holding the vehicle door 10 in an opened position.

If the vehicle door 10 is manually moved from a fixed position, the third coupling state can be released and the drive unit 2 can be decoupled from the vehicle door 10 to allow a free and unhindered movement of the vehicle door 10 by a user.

Figure 3:
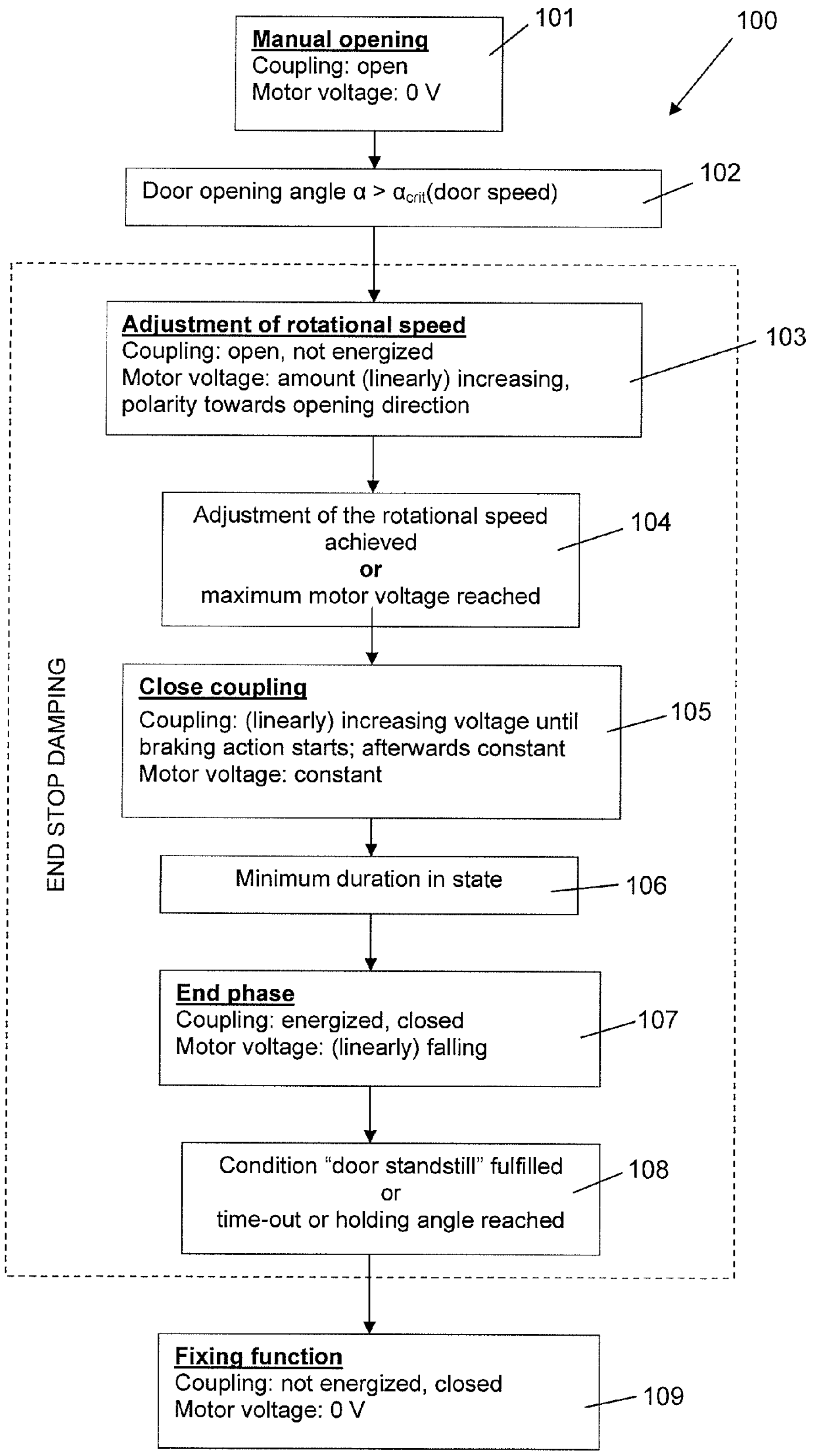
FIG. 3 shows a schematic flow diagram for controlling the opening movement of the vehicle door.

In FIG. 3 a method 100 for providing an end stop damping when opening the vehicle door 10 is schematically illustrated.

First, the vehicle door 10 is in a closed or not fully opened position from which in step 101 a manual door opening procedure is started. The coupling device 21 in the beginning is decoupled and, hence, open.

Starting from this step 101 it is checked in step 102 whether the opening angle $\alpha$ of the vehicle door 10 is larger than a critical opening angle $\alpha_{crit}$ (see FIG. 1). This critical opening angle $\alpha_{crit}$ depends on the moving speed of the vehicle door 10 and is determined according to the moving speed of the vehicle door 10 on a case-to-case basis. The critical opening angle $\alpha_{crit}$ herein is determined from the required braking path of the vehicle door 10 and is determined from the difference of the desired opening angle, corresponding to a maximum opening angle $\alpha_{max}$, and the required braking angle which is estimated assuming a linear dependence between the angular speed of the vehicle door 10 and the braking path of the vehicle door 10.

If the opening angle $\alpha$ of the vehicle door 10 exceeds the critical opening angle $\alpha_{crit}$, an adjustment of the rotational speed takes place during which the rotational speed of the drive unit 2 is adjusted to the moving speed of the vehicle door 10 (step 103). Herein the coupling device 21 is in the first coupling state, i.e. it is open and not energized. For controlling the rotational speed of the drive unit 2 the motor voltage applied to the motor is increased until the rotational speed of the drive unit 2 is adjusted to the moving speed of the vehicle door 10.

The rotational speed of the drive unit 2 is detected via a rotational speed sensor 31 (see FIG. 2), whereas the position and speed sensor 32 measures the moving speed (angular speed) of the vehicle door 10. If the rotational speed sensor 31 is formed as a Hall sensor, the angular speed ω of the drive shaft of the drive unit 2 results from the number of the received Hall signals $n_{Hall}$ per rotation of the drive shaft and the period signal of the motor T to be $$\omega=2\pi/(T\cdot n_{Hall}).$$

From this, by division through the transmission ratio between drive unit 2 and vehicle door 10, it is computed which angular speed of the vehicle door 10 this would correspond to. If the angular speed thus computed is larger or equal to the angular speed of the vehicle door measured through the position and speed sensor 32, it is assumed that the adjustment of the rotational speed has been achieved, i.e. the rotational speed of the drive unit 2 is adjusted to the moving speed of the vehicle door 10.

In step 104 it is checked whether the adjustment of the rotational speed has taken place and whether a maximum motor voltage has been reached, i.e. the rotational speed of the drive unit 2 cannot be increased further.

If the adjustment of the rotational speed has taken place in step 105, the coupling between the drive unit 2 and the vehicle door 10 is established in that the coupling device 21 is transferred into the second coupling state in which the coupling device 21 is energized and the drive unit 2 is coupled with the vehicle door 10. At the same time, the motor voltage applied to the drive unit is kept constant, i.e. the rotational speed of the drive unit 2 is at this time not changed. For a minimum duration the motor voltage is kept constant (step 106).

To decelerate the vehicle door 10 before reaching the maximum opening angle $\alpha_{max}$ and to avoid the vehicle door 10 hitting the end stop in step 107 the motor voltage is linearly decreased and thereby the rotational speed of the drive unit 2 is reduced. Due to the coupling of the drive unit 2 with the vehicle door 10 thereby also the vehicle door 10 is decelerated in a controlled manner.

In step 108 it is checked whether a standstill of the vehicle door 10 is reached or the vehicle door 10 has reached the maximum opening angle $\alpha_{max}$. The vehicle door 10 hereby is assumed to stand still if the amount of the measured moving speed (angular speed) of the vehicle door 10 for a pre-determined time falls below a pre-defined (small) value.

If the standstill of the vehicle door 10 is reached, in step 109 the vehicle door 10 is fixedly held and for this the coupling device 21 is transferred into the third coupling state in which the coupling device 21 is not energized, however the coupling is maintained.

In addition, during the method 100 it is continuously checked whether the door opening angle α is smaller than when starting the opening movement in step 101. This indicates an intervention of a user and a counteraction for ending the opening movement (a pull back of the vehicle door 10). Accordingly, the method 100 for the opening is stopped and a method for closing the vehicle door 10 is initiated.

Figure 4:
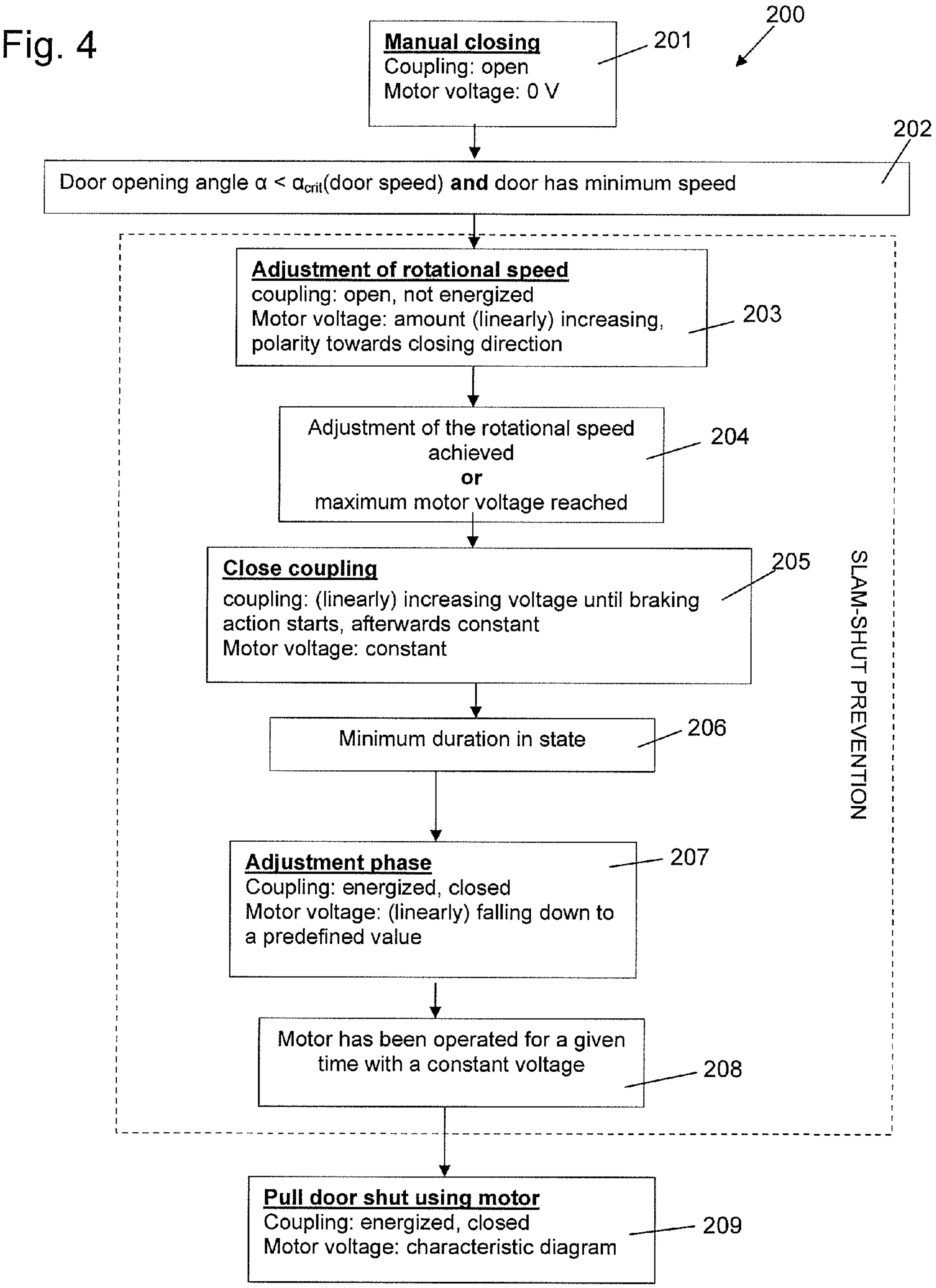
FIG. 4 shows a schematic flow diagram for controlling the closing movement of a vehicle door and FIG. 5 shows a graphic view of the energization of a coupling device for transferring the coupling device into different coupling states.

To prevent an uncontrolled slam-shut when closing the vehicle door 10 the movement of the vehicle door 10 can be controlled via the drive unit 2 also during the closing. A method 200 of this kind is schematically shown in FIG. 4.

Here, it is started from a state in which the vehicle door 10 shall be closed from a fully or partially opened position. The closing is initiated manually (step 201), wherein the coupling device 21 is in the first coupling state and, thus, is non-energized and open. No motor voltage is applied to the drive unit 2.

First, after the manual initiation of the closing movement in step 202 it is checked whether the door opening angle α is smaller than a critical opening angle $\alpha_{crit}$ and at the same time the vehicle door 10 is moved with a predefined minimum speed. The critical opening angle $\alpha_{crit}$ again is determined individually and on a case-to-case basis according to the moving speed of the vehicle door 10, depends on the required braking path of the vehicle door 10 and in general differs from the critical opening angle $\alpha_{crit}$ for providing the end stop damping when opening the vehicle door 10. The reason for checking whether the vehicle door 10 moves faster than a predefined minimum speed is explained by the fact that a slam-shut prevention is not necessary if the vehicle door 10 moves slowly.

If the door opening angle α is smaller than a critical opening angle $\alpha_{crit}$ and if the vehicle door 10 moves with a moving speed larger or equal to the minimum speed, in step 203, at first, an adjustment of the rotational speed takes place during which a linearly increasing motor voltage is applied to the drive unit 2 and thereby the rotational speed of the drive unit 2 is adjusted to the moving speed of the vehicle door 10. The coupling device 21 herein is in the first coupling state, i.e. it is open and not energized.

In step 204 it is checked whether the adjustment of the rotational speed has taken place or, possibly, the maximum motor voltage and, thus, the maximum rotational speed of the drive unit 2 has been reached.

If the adjustment of the rotational speed has taken place, in step 205 the coupling of the drive unit 2 with the vehicle door 10 is established. The motor voltage and, hence, the rotational speed of the drive unit 2 are kept constant for a minimum duration (step 206).

In step 207 the motor voltage applied to the drive unit 2 is reduced and thereby the rotational speed of the drive unit 2 is decreased such that the vehicle door 10 coupled with the drive unit 2 is decelerated. The motor voltage herein is reduced to a predefined value which corresponds to a predefined moving speed of the vehicle door 10. In contrast to the end stop damping, hence, the vehicle door 10 is not decelerated into a standstill, but only is transferred into a reduced, pre-defined moving speed.

In step 208 the vehicle door 10 is moved for a given time with a pre-defined reduced moving speed and in step 209 is transferred motorically into a closed state, corresponding for example to a pre-engagement position of the vehicle door 10. The motor voltage herein is adjusted according to a characteristic diagram which is adapted in a suitable manner for closing the vehicle door 10.

Figure 5:
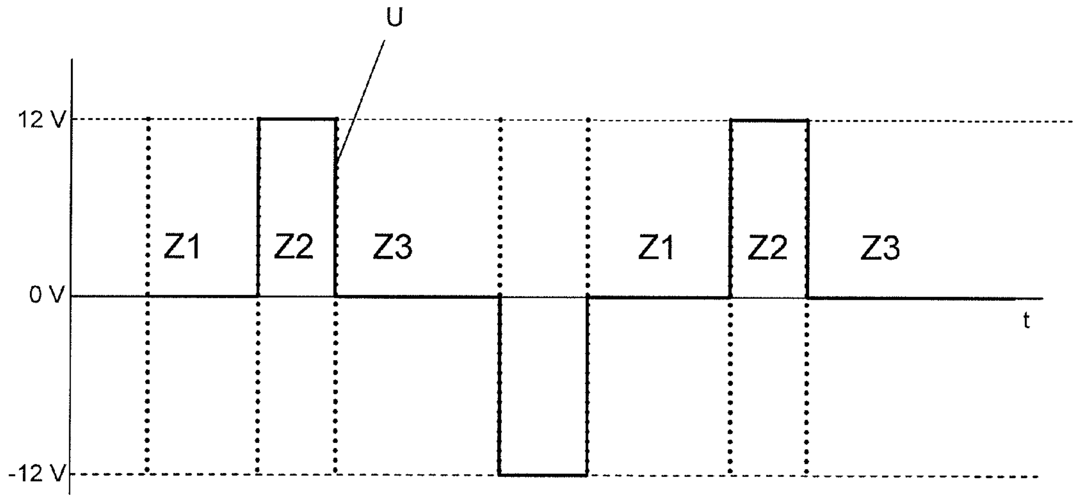

The actuation of the coupling device 21 for the transfer into the different coupling states by applying a voltage U is shown by way of example in FIG. 5 as a function of time t.

At first, the coupling device 21 is in a first coupling state Z1 in which the voltage U applied to the coupling device 21 has an amount of 0 Volt and the coupling device 21 is decoupled. This coupling state Z1 is also referred to as "non-energized open".

If a positive voltage U of for example 12V is applied to the coupling device 21, the coupling device 21 is transferred into a second coupling state Z2 in which the coupling device 21 is actuated and the drive unit 2 is coupled with the vehicle door 10. The coupling device 21 is in this state Z2 to motorically move the vehicle door 10.

If subsequently a voltage U of 0 Volt is applied, the coupling device 21 reaches a third coupling state Z3 in which the coupling device 21 couples the drive unit 2 with the vehicle door 10, herein however is not energized and, hence, does not consume power. This coupling state Z3 is referred to as "non-energized holding". In the third coupling state Z3 the vehicle door 10 can, via the engagement of the coupling device 21, be fixedly held in an opened position without thereby straining the electric supply system of the vehicle.

To transfer the coupling device 21 from the third coupling state Z3 again into the first coupling state Z1 a negative voltage U of for example −12 Volt is applied to the coupling device 21 for a short period of time, and thereby the coupling engagement of the coupling device 21 is released. In the first coupling state Z1 the drive unit 2 is separated from the vehicle door 10 such that the vehicle door 10 can be moved freely and independently from the drive unit 2 in a manual fashion.

It is also possible to apply a negative voltage pulse immediately after the second coupling state Z2 such that the coupling device 21 from the second coupling state Z2 directly transfers back into the first coupling state Z1.

Via the drive unit 2 the vehicle door 10 can also be moved in a completely motoric fashion. For this, the coupling device 21 establishes a coupling of the drive unit 2 with the vehicle door 10 such that the drive unit 2 is in engagement with the vehicle door 10 and can transfer a torque onto the vehicle door 10.

As illustrated in FIG. 1 the opening path of the vehicle door 10 is divided into different angular regions. In a first angular region between $\alpha=0°$ and $\alpha=\alpha_{fix}$ (for example11°) the vehicle door 10 is not held if an opening movement is interrupted, i.e. the vehicle door 10 is not fixedly held, and the coupling device 21 moves into the first coupling state in which the drive unit 2 and the vehicle door 10 are decoupled.

If the movement of the vehicle door 10, in contrast, is interrupted within the angular region between $\alpha=\alpha_{fix}$ and $\alpha=\alpha_{max}$ (so called fixing region) the vehicle door 10 is fixedly held. The coupling device 21 for this is brought into the third coupling state in which the coupling device 21 is not energized, however the coupling between the drive unit 2 and the vehicle door 10 is maintained. Via the drive unit 2, hence, the vehicle door 10 is held in the respectively reached position and is fixed such that an unwanted movement of the vehicle door 10 is prevented.

If the vehicle door 10 being fixedly held within the fixing region is manually moved from the fixedly held position, the coupling device 21 again is transferred into the first coupling state in which the drive unit 2 and the vehicle door 10 are decoupled such that a user can freely and without large effort move the vehicle door 10.

If the vehicle door 10 within the fixing region, when manually moving the vehicle door 10, falls below a pre-defined angular speed for a pre-defined time, this is interpreted as a holding command by the user and the coupling device 21 is transferred via the second coupling state into the third coupling state in which the vehicle door 10 is fixedly held.

In an angular region between $\alpha=\alpha_{jam}$ (for example15°) and $\alpha=0$ (corresponding to the closed position) in addition a jam protection is provided which is always active if the vehicle door 10 is closed motorically, i.e. during the (automatic) electric closing. During a manual closing by a user the jam protection is not active. In combination with a slam-shut prevention however also during the manual closing it is transferred into the state of the automatic, electric closing after decelerating the vehicle door 10 and, hence, into a motorically controlled movement (steps 205 and the following according to FIG. 4) during which the jam protection is active.

The active region of the jam protection is freely definable. The boundary angle for the jam protection $\alpha_{jam}$, herein, may also be larger than 15°.

At a door opening angle $\alpha>\alpha_{jam}$ no active jam protection takes place. However, also in this angular region a blocking detection is performed in the context of which it is monitored whether the movement of the vehicle door 10 is blocked and the moving procedure should be interrupted by means of an overload switch-off. The required forces until the termination of the door movement are larger than for a jam protection, and no reversing of the vehicle door 10 is carried out, but the coupling device 21 is only decoupled. Background of this is that for example at an inclined position of the vehicle 1 a larger load of the drive train can occur such that the initiation of the blocking detection is to be set in an accordingly robust manner to avoid a false initiation. The initiation threshold of the blocking detection is freely settable. A blocking state is detected if the initiation threshold is exceeded for a pre-defined time. Thereupon the motor is switched off and the coupling is decoupled.

In the angular region between $\alpha=\alpha_{jam}$ and $\alpha=0$ (jam protection region) an active jam protection takes place. The vehicle door shortly before entering into the jam protection region is brought into a pre-defined, constantly reduced angular speed or into a variably reduced angular speed using a stored angle dependent characteristic diagram. Thereby, on the one hand the detection of a jamming situation is made easier and on the other hand the jamming force occurring during a jamming situation are reduced because of the reduced moving speed of the vehicle door 10. In addition, because of the lower moving speed of the vehicle door 10 it can be reversed faster, because the vehicle door 10 does not have to be decelerated and reversed from a large, but only from a pre-defined small moving speed.

The detection of a jamming situation can for example be performed by analysing the angular speed of the vehicle door 10 or the rotational speed of the drive unit 2. Conceivable, in addition, are directly detecting, contactless or contacting sensors, for example capacitive sensors or touch sensors which directly monitor the space in reach of the vehicle door 10.

During the automatic and manual electrical closing the starting angle of the vehicle door 10 is stored. The reversing of the vehicle door 10, when detecting a jamming, then is performed by a pre-defined angle, however at maximum until the stored starting angle. Background of this is that it shall be prevented that the vehicle door 10 hits an object standing next to the vehicle 1, for example an adjacent vehicle on a parking lot, during the reversing. A reversing beyond the starting angle, thus, is not possible such that the vehicle door 10 during the reversing is not opened further than the starting angle at the initiation of the closing movement and, hence, the hitting of an adjacent object is not possible. Shortly before reaching the starting angle or the maximum door opening angle the vehicle door 10 is linearly decelerated into a standstill such that a harmonic movement results.

The idea underlying the invention is not limited to the embodiments described above, but can also be realized within completely different embodiments. In particular, the described method and the described device can also be applied at other vehicle parts than a vehicle door, for example at a rear door, a sliding side door or a sun roof. Advantageously, herein the end stop damping and the slam-shut prevention are combined with each other, but can also be used separately from each other in that at a vehicle part for example only an end stop damping, but no slam-shut prevention, or vice versa are used.

The invention claimed is:

1. A device for controlling the movement of a both motorically and manually movable vehicle part, the device comprising:

a drive unit having a controllable rotational speed for motorically moving the vehicle part;

a coupling device for coupling the drive unit with the vehicle part;

a control unit controlling the drive unit and the coupling device such that during a manual movement of the vehicle part, the coupling device couples the drive unit with the vehicle part if the vehicle part has reached a pre-defined position; and wherein for coupling the drive unit with the vehicle part, the control unit controls the rotational speed of the drive unit depending on a moving speed of the vehicle part, the control unit being configured to synchronize the rotational speed of the drive unit with the movement of the vehicle part prior to establishing the coupling of the drive unit with the vehicle part; and wherein the coupling device comprises three coupling states, wherein: in a first coupling state, the drive unit is decoupled from the vehicle part such that the vehicle part is manually movable independent from the drive unit; in a second coupling state, the drive unit is coupled with the vehicle part for motorically moving the vehicle part and the coupling device is continuously energized for actuation; and in a third coupling state, the drive unit is coupled with the vehicle part for arresting the vehicle part in an at least partially opened position, wherein the coupling device is not energized for the actuation.

2. A device according to claim 1, wherein the control unit adjusts the rotational speed of the drive unit such that the rotational speed of the drive unit is adjusted to the moving speed of the vehicle part.

3. A device according to claim 1, wherein the coupling device is configured to establish a force locking or positive locking coupling of the drive unit with the vehicle part.

4. A device according to claim 1, further comprising a rotational speed sensor for detecting the rotational speed of the drive unit and a position and speed sensor for detecting at least a position or the moving speed of the vehicle part.

5. A device according to claim 1, configured for providing an end stop damping during moving the vehicle part into an opened position.

6. A device according to claim 5, configured to provide a slam-shut protection during moving the vehicle part into a closed position.

7. A device according to claim 6, wherein for providing at least the end stop damping or the slam-shut damping, the control unit controls the rotational speed of the drive unit for decelerating the vehicle part subsequent to the control unit establishing the coupling of the drive unit with the vehicle part.

8. A method for controlling the movement of a both motorically and manually movable vehicle part, using a device comprising a drive unit controllable in its rotational speed for motorically moving the vehicle part, a coupling device for coupling the drive unit with the vehicle part, and a control unit for controlling the drive unit and the coupling device, the method comprising:

coupling the drive unit via the coupling device with the vehicle part during manually moving the vehicle part if the vehicle part has reached a predefined position; and adjusting a rotational speed of the drive unit to the moving speed of the vehicle part for coupling the drive unit with the vehicle part, wherein the rotational speed of the drive unit is synchronized with the movement of the vehicle part prior to establishing the coupling of the drive unit with the vehicle part;

wherein the coupling device comprises three coupling states, wherein: in a first coupling state, the drive unit is decoupled from the vehicle part such that the vehicle part is manually movable independent from the drive unit; in a second coupling state, the drive unit is coupled with the vehicle part for motorically moving the vehicle part and the coupling device is continuously energized for actuation; and in a third coupling state, the drive unit is coupled with the vehicle part for arresting the vehicle part in an at least partially opened position, wherein the coupling device is not energized for the actuation.

9. A method according to claim 8, wherein a critical opening angle corresponding to the predefined position is determined depending on a moving speed of the vehicle part, wherein the drive unit is coupled via the coupling device with the vehicle part if the vehicle part has reached the critical opening angle.

10. A method according to claim 8, further comprising energizing the coupling device for actuation for establishing the coupling of the drive unit with the vehicle part.

11. A method according to claim 10, further comprising reducing the rotational speed of the drive unit for decelerating the vehicle part after establishing the coupling, wherein the coupling device is energized for maintaining the coupling.

12. A method according to claim 8, further comprising decelerating the vehicle part into a standstill with the drive unit for providing an end stop damping when moving the vehicle part into an opened position.

13. A method according to claim 12, further comprising maintaining with the coupling device the coupling of the drive unit with the vehicle part after reaching the standstill and, thus, the coupling device fixedly holding the vehicle part.

14. A method according to claim 8, further comprising decelerating the vehicle part into a predefined moving speed with the drive unit for providing a slam-shut prevention when moving the vehicle part into a closed position.

15. A method according to claim 14, wherein the moving of the vehicle part into the closed position in an end phase is performed motorically through the drive unit.

16. A method according to claim 15, wherein in the end phase, the moving of the vehicle part is monitored and controlled for providing a jam protection.

* * * * *